(12) United States Patent
Johnstun et al.

(10) Patent No.: US 12,601,262 B1
(45) Date of Patent: Apr. 14, 2026

(54) GAS TURBINE ENGINES, METHODS OF SECURING ROTATING COMPONENTS THEREIN WITH THREADED NUTS, AND THE THREADED NUTS

(71) Applicant: HONEYWELL INTERNATIONAL INC., Charlotte, NC (US)

(72) Inventors: Clay R. Johnstun, Phoenix, AZ (US); Hari Shrestha, Maineville, OH (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 0 days.

(21) Appl. No.: 19/194,458

(22) Filed: Apr. 30, 2025

(51) Int. Cl.
*F01D 5/02* (2006.01)
*F16B 33/04* (2006.01)

(52) U.S. Cl.
CPC .............. *F01D 5/025* (2013.01); *F16B 33/04* (2021.08); *F05D 2260/31* (2013.01)

(58) Field of Classification Search
CPC ......... F01D 5/025; F04D 29/054; F16B 37/00
See application file for complete search history.

(56) References Cited

U.S. PATENT DOCUMENTS

| | | | | |
|---|---|---|---|---|
| 2,330,511 | A | 9/1943 | Money | |
| 5,791,997 | A | 8/1998 | Barney et al. | |
| 5,927,921 | A * | 7/1999 | Hukari | F16B 31/06 411/186 |
| 6,428,272 | B1 * | 8/2002 | Pepi | F01D 5/066 416/198 A |

| | | | | |
|---|---|---|---|---|
| 6,439,818 | B1 * | 8/2002 | Nagayama | F16B 37/00 470/25 |
| 6,702,536 | B2 * | 3/2004 | Nilsen | F16B 37/061 411/386 |
| 6,908,272 | B2 * | 6/2005 | Nilsen | F16B 35/047 411/171 |
| 9,267,534 | B2 | 2/2016 | Flaig | |
| 9,708,912 | B2 * | 7/2017 | Murphy | F16B 37/00 |
| 11,203,934 | B2 * | 12/2021 | Kray | F01D 5/066 |
| 11,953,046 | B2 * | 4/2024 | Shibusawa | F16B 33/02 |
| 2024/0240664 | A1 | 7/2024 | Flaig | |

FOREIGN PATENT DOCUMENTS

| | | | |
|---|---|---|---|
| CN | 201615127 U | | 10/2010 |
| CN | 105570269 | * | 5/2016 |

* cited by examiner

*Primary Examiner* — Christopher R Legendre
(74) *Attorney, Agent, or Firm* — Ingrassia, Fisher & lorenz LLP

(57) ABSTRACT

Gas turbine engines and methods of securing rotating components therein with a threaded nut. The threaded nut is configured to releasably couple with a shaft to secure a rotating component thereon. The threaded nut may include a body having a bore extending therethrough defined by inner surfaces thereof, threads protruding from the inner surfaces configured to mate with threads of the shaft, and a nut face on an end of the body configured to contact a contact surface of the rotating component or another component in contact therewith and apply an axial load thereon that is sufficient to maintain a fixed axial position of the rotating component. The nut face includes a contoured surface configured to bias the axial load toward a radially outer portion of the nut face to reduce loading on a first of the threads of the shaft closest to the contact surface.

10 Claims, 9 Drawing Sheets

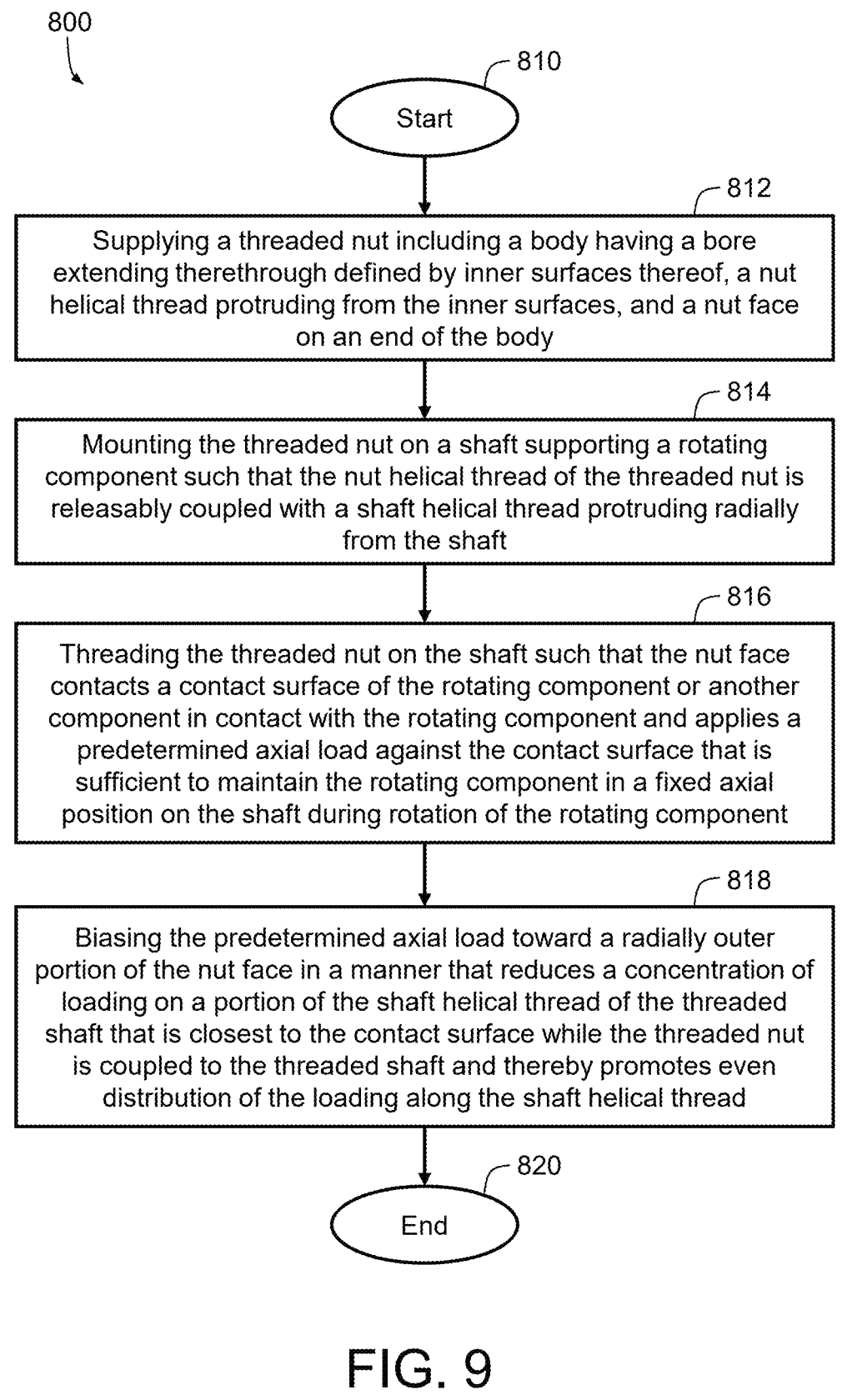

800

810

Start

812

Supplying a threaded nut including a body having a bore extending therethrough defined by inner surfaces thereof, a nut helical thread protruding from the inner surfaces, and a nut face on an end of the body

814

Mounting the threaded nut on a shaft supporting a rotating component such that the nut helical thread of the threaded nut is releasably coupled with a shaft helical thread protruding radially from the shaft

816

Threading the threaded nut on the shaft such that the nut face contacts a contact surface of the rotating component or another component in contact with the rotating component and applies a predetermined axial load against the contact surface that is sufficient to maintain the rotating component in a fixed axial position on the shaft during rotation of the rotating component

818

Biasing the predetermined axial load toward a radially outer portion of the nut face in a manner that reduces a concentration of loading on a portion of the shaft helical thread of the threaded shaft that is closest to the contact surface while the threaded nut is coupled to the threaded shaft and thereby promotes even distribution of the loading along the shaft helical thread

820

End

FIG. 9

GAS TURBINE ENGINES, METHODS OF SECURING ROTATING COMPONENTS THEREIN WITH THREADED NUTS, AND THE THREADED NUTS

TECHNICAL FIELD

The present invention generally relates to rotating machinery, such as gas turbine engines, and more particularly relates to a nut used on a threaded shaft to apply a compressive axial force to a plurality of stacked components to secure the position the components.

BACKGROUND

In rotating assemblies used in high speed machinery, components are often clamped either by a tie-shaft and nut or by bolted flange joints. In many applications, nuts are used to apply compressive forces on multiple components, securing them in a stacked relationship. These nuts, in combination with the tie-shaft or bolt, maintain the axial location of the components relative to each other and ensure that radial position is controlled.

Gas turbine engines include rotating components such as a fan, a compressor, a shaft, a seal, and a turbine. A nut is often used on the end of a threaded shaft to secure and position engine components relative to the shaft. A forward abutting surface may be employed from either a radial flange extending outward from a forward section of the shaft or from another component that the forward end of the shaft threads into. The engine components are stacked along or relative to the shaft, for example, such that the shaft extends through the center of the components. The nut is threaded to the shaft to apply a compressive force through the components that secures them in place relative to the shaft.

As gas turbine engine operating conditions continue to increase in rotational speed, temperature, etc., ever higher axial clamp loads are needed in tie-shafts and the like to maintain rotor integrity. Hence, there is an ongoing desire for improved systems and methods for securing rotating components in high speed machinery. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In various examples, a threaded nut is provided that is configured to releasably couple with a threaded shaft to secure a rotating component thereon. The threaded nut may include a body having a bore extending therethrough defined by inner surfaces thereof, a nut helical thread protruding from the inner surfaces that is configured to mate with a corresponding shaft helical thread of the threaded shaft, and a nut face on an end of the body configured to contact and provide an axial load on a contact surface of or in contact with the rotating component when the threaded nut is coupled to the threaded shaft. The nut face may include a contoured surface configured to bias the axial load toward a radially outer portion of the nut face in a manner that reduces a concentration of loading on a portion of the shaft helical thread of the threaded shaft that is closest to the contact surface while the threaded nut is coupled to the threaded shaft and thereby promotes even distribution of the loading along the shaft helical thread.

In various examples, a gas turbine engine is provided that may include a tie-shaft extending axially within the gas turbine engine and including a threaded portion having a shaft helical thread protruding radially therefrom, a rotating component secured on the tie-shaft, and a threaded nut having a body with a bore extending therethrough defined by inner surfaces thereof, a nut helical thread protruding from the inner surfaces that are mated with the shaft helical thread of the tic-shaft, and a nut face on an end of the body. A majority of the nut face directly contacts a contact surface of the rotating component or of another component in contact with the rotating component and applies an axial load on the contact surface that is sufficient to maintain an axial position of the rotating component on the tie-shaft during operation of the gas turbine engine. The nut face includes a contoured surface configured to bias the axial load toward a radially outer portion of the nut face in a manner that reduces a concentration of loading on a portion of the shaft helical thread of the tie-shaft that is closest to the contact surface and thereby promotes even distribution of the loading along the shaft helical thread.

In various examples, a method is provided that may include supplying a threaded nut including a body having a bore extending therethrough defined by inner surfaces thereof, a nut helical thread protruding from the inner surfaces, and a nut face on an end of the body, mounting the threaded nut on a threaded shaft supporting a rotating component such that the nut helical thread of the threaded nut is releasably coupled with a shaft helical thread protruding radially from the threaded shaft, threading the threaded nut on the threaded shaft such that the nut face contacts a contact surface of the rotating component or another component in contact with the rotating component and provides a predetermined axial load thereagainst that is sufficient to maintain the rotating component in a fixed axial position on the threaded shaft during rotation of the rotating component, and biasing the predetermined axial load toward a radially outer portion of the nut face in a manner that reduces a concentration of a load applied on a portion of the shaft helical thread of the threaded shaft that is closest to the contact surface and thereby promotes even distribution of the loading along the shaft helical thread Furthermore, other desirable features and characteristics of the threaded nut, gas turbine engine, and method will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein:

FIG. 9 is a flowchart illustrating an exemplary method for securing a rotating component on a shaft in accordance with an embodiment.

DETAILED DESCRIPTION

Figure 1:
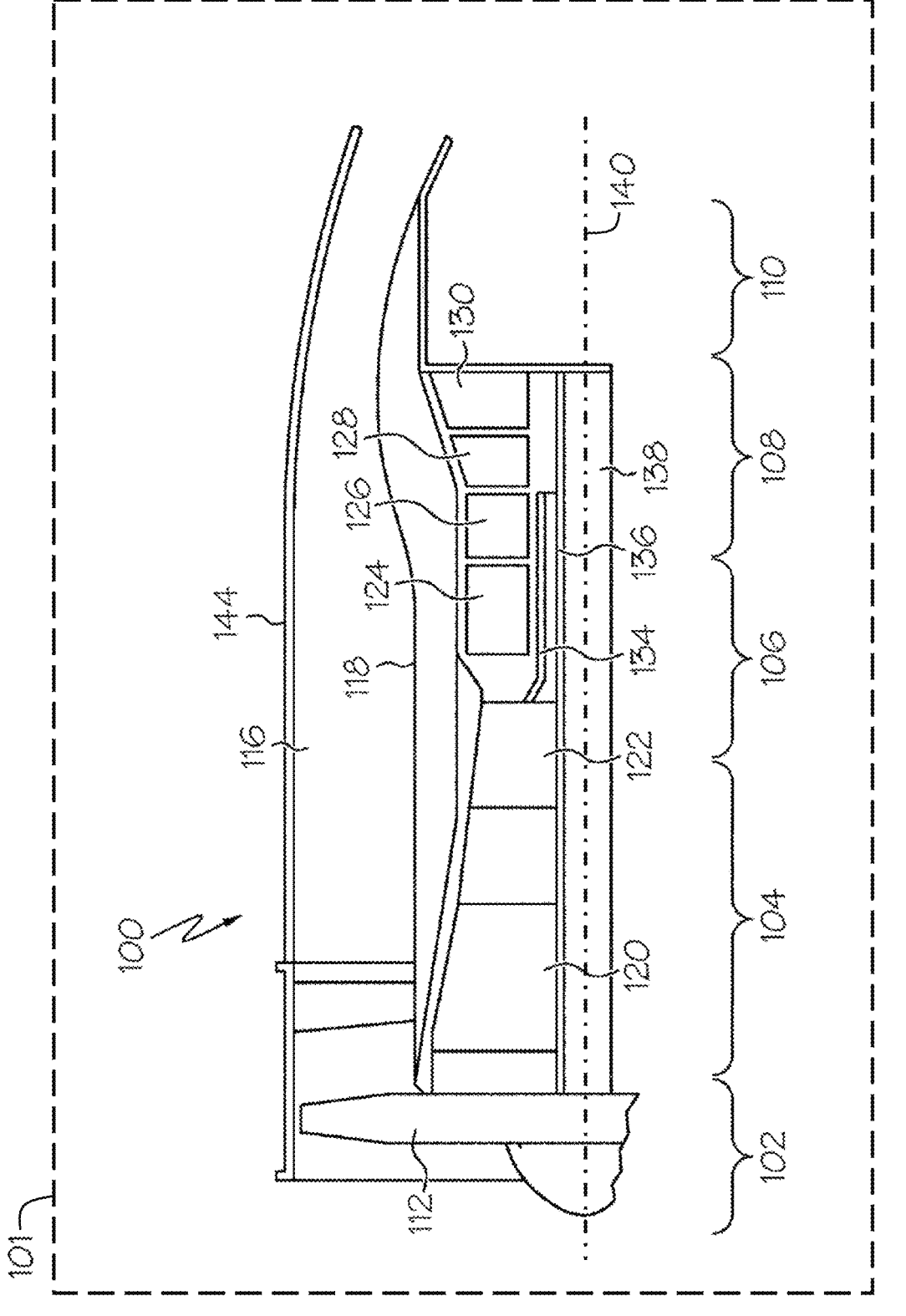
FIG. 1 is a schematic view of a gas turbine engine in accordance with an embodiment.

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, the present invention provides systems and methods for securing rotating components along a shaft, such as rotating component groups used in gas turbine engines that are clamped on a tie-shaft with a threaded nut. For convenience, threaded portions of shafts, bolts, nuts, etc. are described herein as including at least one helical thread having a plurality of consecutive ridges when viewed from a two-dimensional (2D) cross-sectional perspective. The ridges include a crest referring to a radially innermost surface (i.e., a peak) and a flank referring to a sloped surface extending from the crest. A root refers to a radially outermost surface (i.e., a valley) between the ridges. Although the systems and methods are described herein with reference to threaded portions that include a single helical thread for simplicity of the description, the systems and methods are applicable to threaded portions that includes more than one parallel helical thread.

The systems and methods include a threaded nut that is configured to reduce loading on one or more ridges of the shaft and/or promote uniform loading on the ridges of the shaft. For example, certain existing threaded nuts include uniform, planar faces. When fully threaded onto a threaded shaft (e.g., a tie-shaft) such that the face of the nut contacts a contact surface of the rotating component or component group, the axial load may be concentrated to have a peak stress in the shaft at the first loaded ridge, that is, the ridge that is closest to the contact surface. Since the 2D ridges are representations of the continuous helical thread, it should be understood that the term "first loaded ridge" refers more generally to portions of the helical tread closest to the contact surface. In some situations, this may result in a decreased fatigue life of the shaft. In contrast, the threaded nuts disclosed herein include a contoured face that is configured to reduce the loading on the first loaded ridge of the shaft and, in some examples, promote uniform loading across the ridges of the shaft or otherwise promote a more even distribution of the load on the thread of the shaft. Although the systems and methods are described herein in reference to tie-shafts used in gas turbine engines, the teachings herein may also be applied to the broad sense of rotating assemblies, including, but not limited to motors, generators, magnetic bearings, industrial pumps, steam turbines, air cycle machines, turbo-chargers, and balance arbors.

With reference to FIG. 1, a partial, cross-sectional view of an exemplary gas turbine engine 100 is shown with the remaining portion of the gas turbine engine 100 being substantially axisymmetric about a longitudinal axis 140, which also defines an axis of rotation for the gas turbine engine 100. In the depicted embodiment, the gas turbine engine 100 is an annular multi-spool turbofan gas turbine jet engine within an aircraft (represented schematically at 101), although features of the present disclosure may be included in other configurations, arrangements, and/or uses. For example, in other embodiments, the gas turbine engine 100 may assume the form of a non-propulsive engine, such as an Auxiliary Power Unit (APU) deployed onboard the aircraft 101, an industrial power generator, or other turbomachine.

In this example, with continued reference to FIG. 1, gas turbine engine 100 includes a fan section 102, a compressor section 104, a combustor section 106, a turbine section 108, and an exhaust section 110. In one example, the fan section 102 includes a fan 112 mounted on a rotor that draws air into the gas turbine engine 100 and compresses it. A fraction of the compressed air exhausted from the fan 112 is directed through the outer bypass duct 116 and the remaining fraction of air exhausted from the fan 112 is directed into the compressor section 104. The outer bypass duct 116 is generally defined by an outer casing 144 that is spaced apart from and surrounds an inner bypass duct 118.

The compressor section 104 includes one or more compressors. The number of compressors in the compressor section 104 and the configuration thereof may vary. The one or more compressors sequentially raise the pressure of the air and direct a majority of the high-pressure fluid or air into the combustor section 106. In the embodiment of FIG. 1, the compressor section 104 is represented as including two compressors: a low pressure compressor (LPC) 120 and a high pressure compressor (HPC) 122. Compressors may generally be embodied as radial or mixed flow types. The LPC 120 raises the pressure of the air directed into it from the fan 112, and directs the compressed air into the HPC 122. The HPC 122 compresses the air still further, and directs the high pressure air into the combustor section 106.

In the combustor section 106, which includes a combustion chamber 124, the high-pressure air is mixed with fuel and is combusted. The high-temperature combustion air or combustive gas flow is directed into the turbine section 108. In this example, the turbine section 108 includes three turbines disposed in axial flow series, namely, a high-pressure turbine 126, an intermediate pressure turbine 128, and a low-pressure turbine 130. However, it will be appreciated that the number of turbines, and/or the configurations thereof, may vary. In this embodiment, the high-temperature combusted air from the combustor section 106 expands through and rotates each turbine 126, 128, and 130. The combustive gas flow then exits the turbine section 108 for mixture with the cooler bypass airflow from the outer bypass duct 116 and is ultimately discharged from the gas turbine engine 100 through the exhaust section 110. As the turbines 126, 128, 130 rotate, each drives equipment in the gas turbine engine 100 via concentrically disposed shafts or spools. Specifically, in the illustrated example, the high-pressure turbine 126 drives the HPC 122 via a high pressure spool 134, the intermediate pressure turbine 128 drives the LPC 120 via an intermediate pressure spool 136, and the low-pressure turbine 130 drives the fan 112 via a low pressure spool 138.

Figure 2:
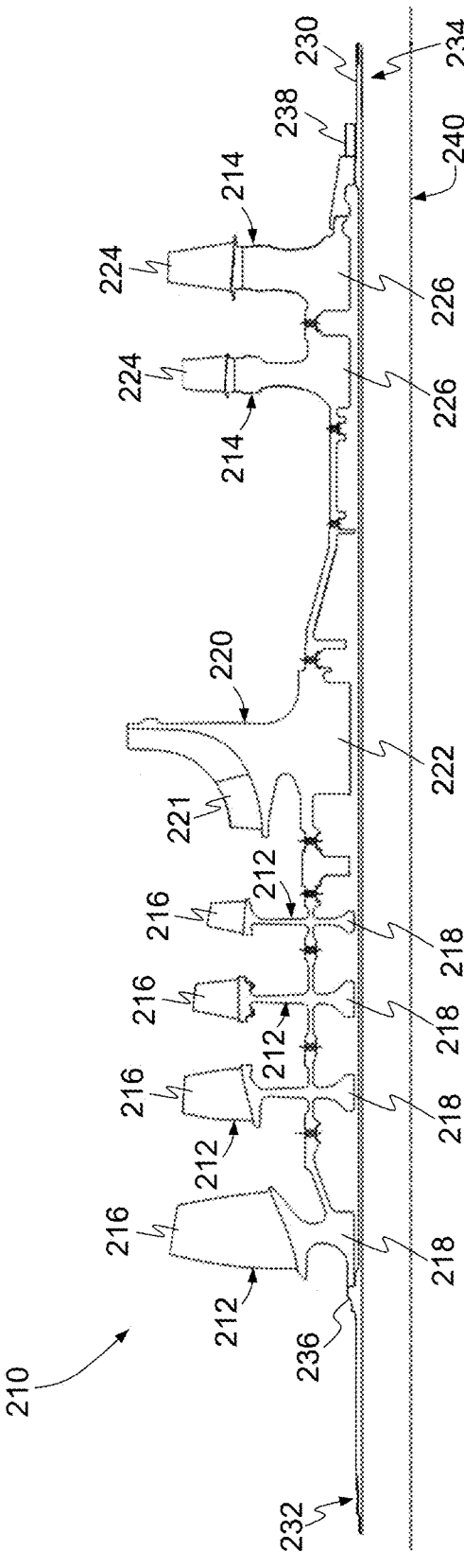
FIG. 2 is a cross-sectional view of a portion of the gas turbine engine that includes a rotating component group secured to a tie-shaft in accordance with an embodiment.
Figure 3:
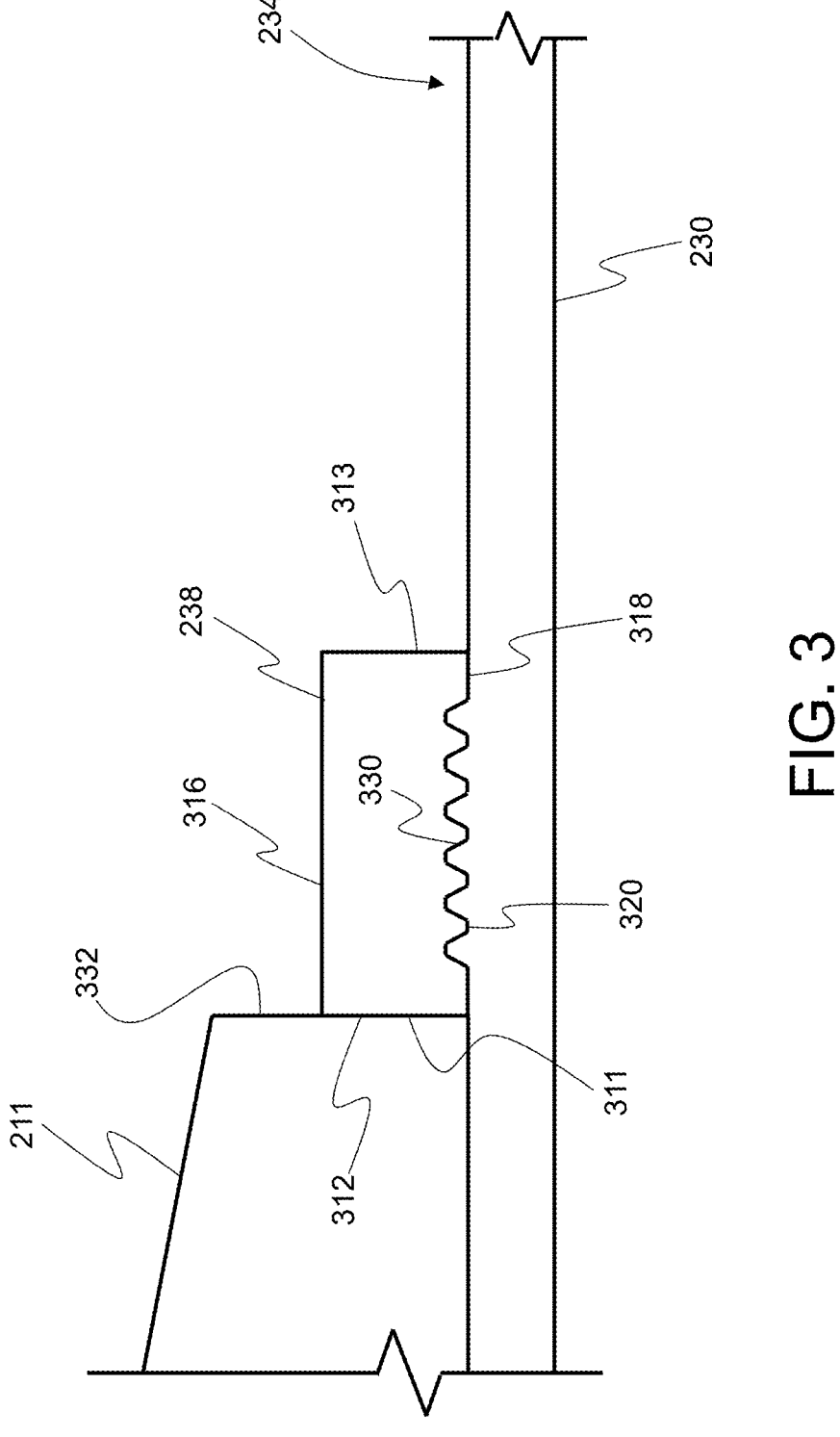
FIG. 3 is an enlarged cross-sectional view of a threaded nut coupled to the tie-shaft of FIG. 2 in accordance with an embodiment.

Referring now to FIGS. 2 and 3, and with continued reference to FIG. 1, a rotating component stack or group 210 is represented in accordance with various examples. The rotating component group 210 may include a plurality of rotating components including compressor rotor assemblies 212 of the HPC 122, an impeller 220, and turbine rotor assemblies 214 of the high-pressure turbine 126. Each of the compressor rotor assemblies 212 include a compressor rotor blade 216 and a compressor rotor disk 218, the impeller 220 includes an impeller blade 221 and an impeller rotor disk 222, and each of the turbine rotor assemblies 214 include a turbine rotor blade 224 and a turbine rotor disk 226. The rotating components may have a common rotational axis 240, and may be secured in fixed relation to each other with a tie-shaft 230.

The tic-shaft 230 may include a forward end 232 and an aft end 234. In this example, the rotating components of the rotating component group 210 may be secured between a radial flange 236, for example, adjacent to the forward end 232 of the tie-shaft 230 and a nut 238, for example, adjacent to the aft end 234 of the tie-shaft 230. The tie-shaft 230 may include a tie-shaft threaded portion for receiving a nut threaded portion of the nut 238. When the nut 238 is fully threaded onto the tie-shaft 230 as represented in FIG. 3, a contact surface 332 of one of the rotating components adjacent to the nut 238 and a nut face 312 of the nut 238 contact to create an axial load across the rotating component group 210 to axially secure the rotating components thereof on the tic-shaft 230. FIG. 3 is an enlarged view of showing the nut 238 mounted on the tie-shaft 230.

Figure 4:
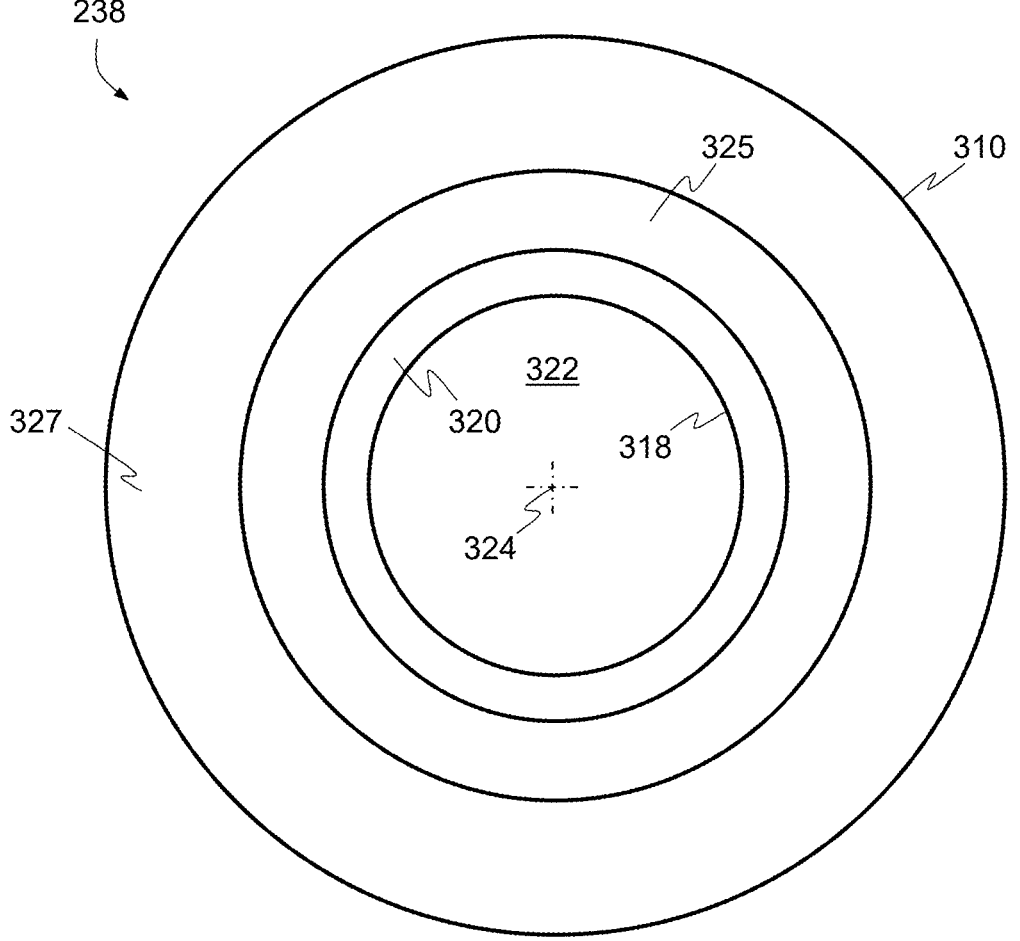
FIG. 4 is a top view of the threaded nut of FIG. 3 in accordance with an embodiment.
Figure 5:
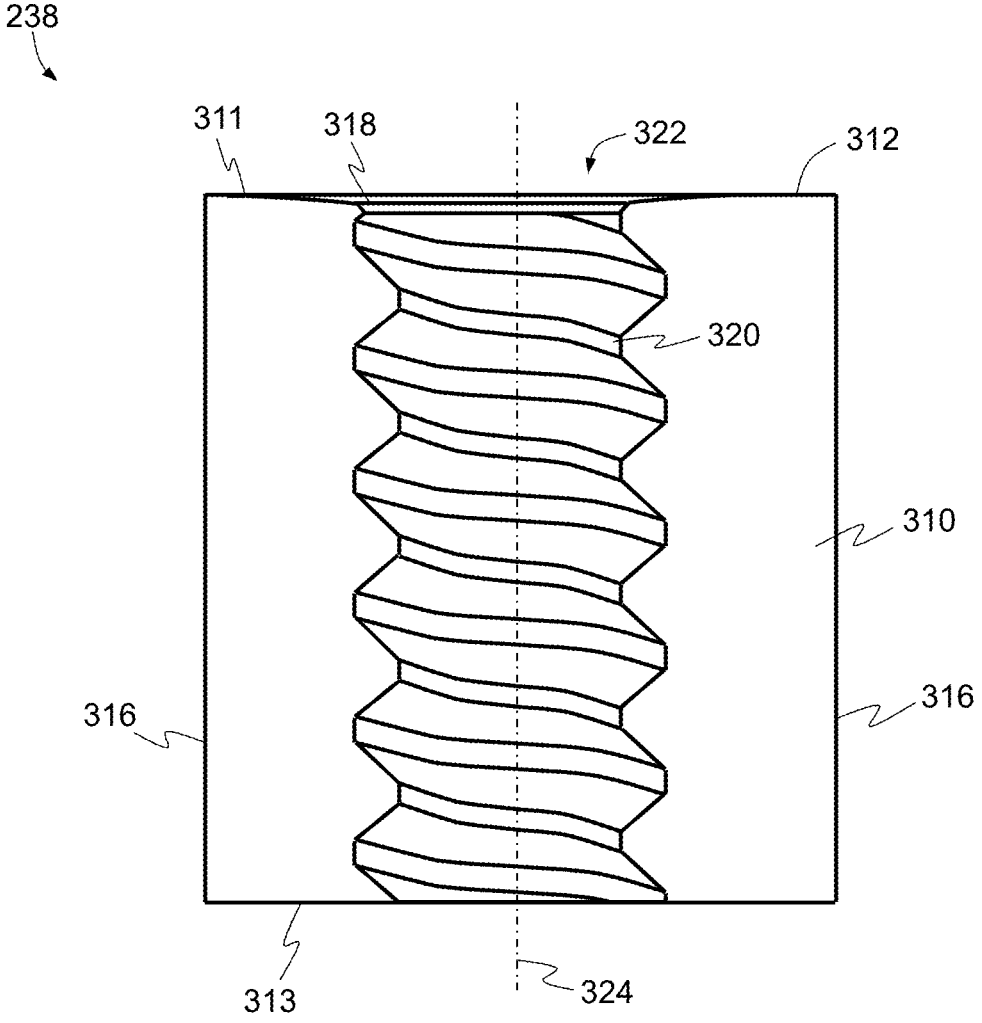
FIG. 5 is a cross-sectional view of the threaded nut of FIGS. 3 and 4 in accordance with an embodiment.
Figure 6:
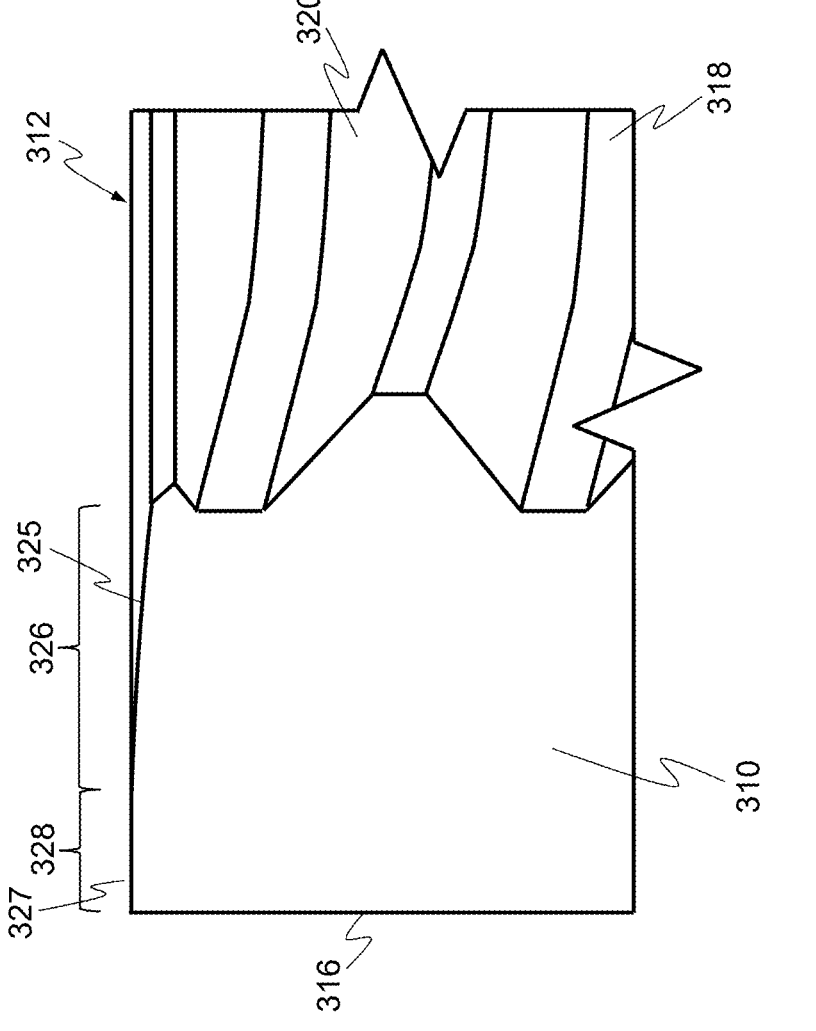
FIG. 6 is an enlarged cross-sectional view of a nut face of the nut of FIGS. 3-5 in accordance with an embodiment.
Figure 7:
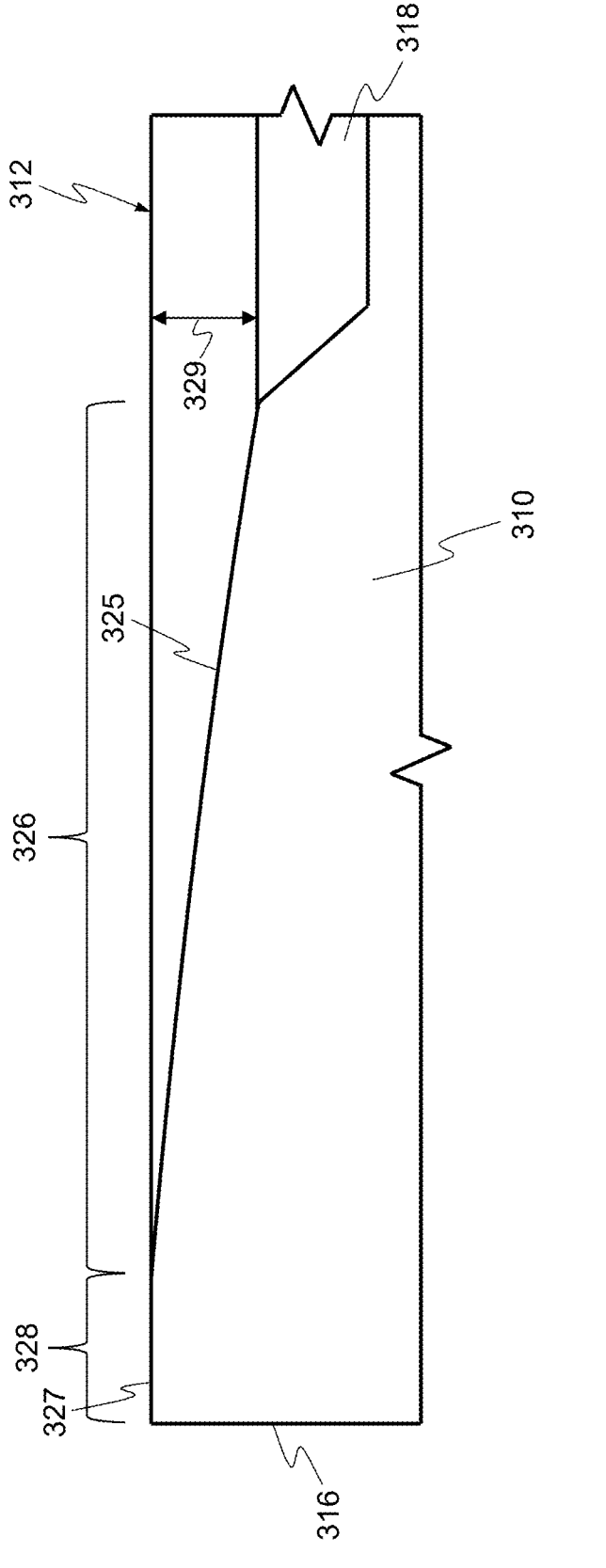
FIG. 7 is an enlarged cross-sectional view of a contoured surface of the nut face of FIGS. 3-6 in accordance with an embodiment.

Referring now to FIG. 4-7, and with continued reference to FIG. 1, the nut 238 is represented in detail in accordance with various examples. FIG. 4 includes an end view representing the nut face 312, FIG. 5 includes a cross-sectional view of the nut 238, and FIGS. 6 and 7 represent enlarged, cross-sectional views of the nut face 312. The nut 238 includes a body 310 having the nut face 312 on a first end 311 of the body 310 opposite a second end 313 of the body 310, and sides 316 between the first end 311 and the second end 313. Inner surfaces 318 define a bore 322 that extends through the body 310 between the first end 311 and the second end 313 thereof and has a central, longitudinal axis 324. The inner surfaces 318 define a helical thread 320 in the nut threaded portion that protrudes therefrom and that is configured to threadedly mate with a corresponding thread 330 of the tie-shaft threaded portion of the tie-shaft 230. Although not shown, the nut 238 may include additional features, such as those configured to promote ease of threading the nut 238 onto the tie-shaft 230. In some examples, an entirety of or portions of the sides 316 may have a non-circular cross-sectional shape to promote mating with a nut tightening tool, such as a hexagonal cross-sectional shape configured to mate with a wrench. In some examples, the second end 313 of the nut 238 may include end castellations configured to mate with a wrenching feature of a nut tightening tool. In some examples, the sides 316 may include a tapered and/or reduced outer diameter portion configured to provide clearance to accommodate mating with a nut tightening tool.

As noted previously, certain existing threaded nuts include uniform, planar nut faces. When these threaded nuts are fully threaded onto a tic-shaft such that the nut face contacts a contact surface of a component of a rotating component group, loads may be concentrated to have a peak stress in the tie-shaft at the first loaded ridge, which may reduce the fatigue life of the tie-shaft. In contrast, the nut face 312 of the nut 238 is configured to reduce loading on the first ridge of the tie-shaft 230 and/or promote uniform loading across the ridges of the tie-shaft 230 (i.e., along the helical thread 330) or otherwise more evenly distribute the load along the thread 330 of the tic-shaft 230 when coupled thereto and in contact with a contact surface of a rotating component or another component in contact with the rotating component. In particular, at least a portion of the nut face 312 includes a contoured surface 325 configured to bias the axial load radially outward. In some examples, an entirety of the nut face 312 may be contoured from a radially outermost edge thereof to a radially inner most edge thereof. In some examples, less than an entirety of the nut face 312 may be contoured. In some examples, a radially outer portion (328 in FIGS. 6-8) of the nut face 312 may be flat or planar and other radially inner portions (326 in FIGS. 6-8) of the nut face 312 may be contoured from the radially outer portion 328 to the bore 322.

In the example of FIGS. 4-8, the nut 238 includes the radially inner portion 326 and the radially outer portion 328. The radially outer portion 328 includes a planar surface 327 that is perpendicular to the central, longitudinal axis 324 of the bore 322. The radially inner portion 326 includes a contoured surface 325 that slopes from the radially outer portion 328 to the bore 322, that is, has a decreasing axial dimension from the radially outer portion 328 to toward the bore 322, or more specifically a common edge at which the nut face 312 meets the inner surfaces 318. With this configuration, the nut face 312 has a minimum axial dimension at a radially innermost portion thereof and a maximum axial dimension at a radially outermost portion thereof as measured from a geometric plane that is perpendicular to the central, longitudinal axis 324 of the bore 322. The difference between the maximum axial dimension and the minimum axial dimension is represented in FIG. 7 by a recessed dimension 329.

In some examples, the contoured surface 325 may have a uniform radius of curvature from the radially outer portion 328 to the bore 322. In some examples, the contoured surface 325 may have a non-uniform radius of curvature. In yet other examples, the radially inner portion 326 may be segmented into two or more contoured portions, wherein at least one of the contoured portions has a respective radius of curvature that is different from one or more of the other contoured portion(s). In such examples, each of the contoured portions may independently have uniform or non-uniform radius of curvatures.

While coupling the nut 238 onto the tie-shaft 230, the planar surface 327 of the radially outer portion 328 will initially contact the contact surface 332 of an adjacent component 211 of the rotating component group 210. Upon additional threading, portions of the contoured surface 325 may progressively contact the contact surface 332 from the radially outermost portion of the contoured surface 325 to the radially innermost portion of the contoured surface 325. The nut 238 may be configured to be coupled to the tie-shaft 230 to apply a predetermined axial load on the rotating component group 210 which in this example is restricted by the radial flange 236. In some examples, upon achieving the predetermined axial load, a majority of the nut face 312 may directly contact the contact surface 332. In some examples, upon achieving the predetermined axial load, an entirety of the nut face 312 may directly contact the contact surface 332.

Figure 8:
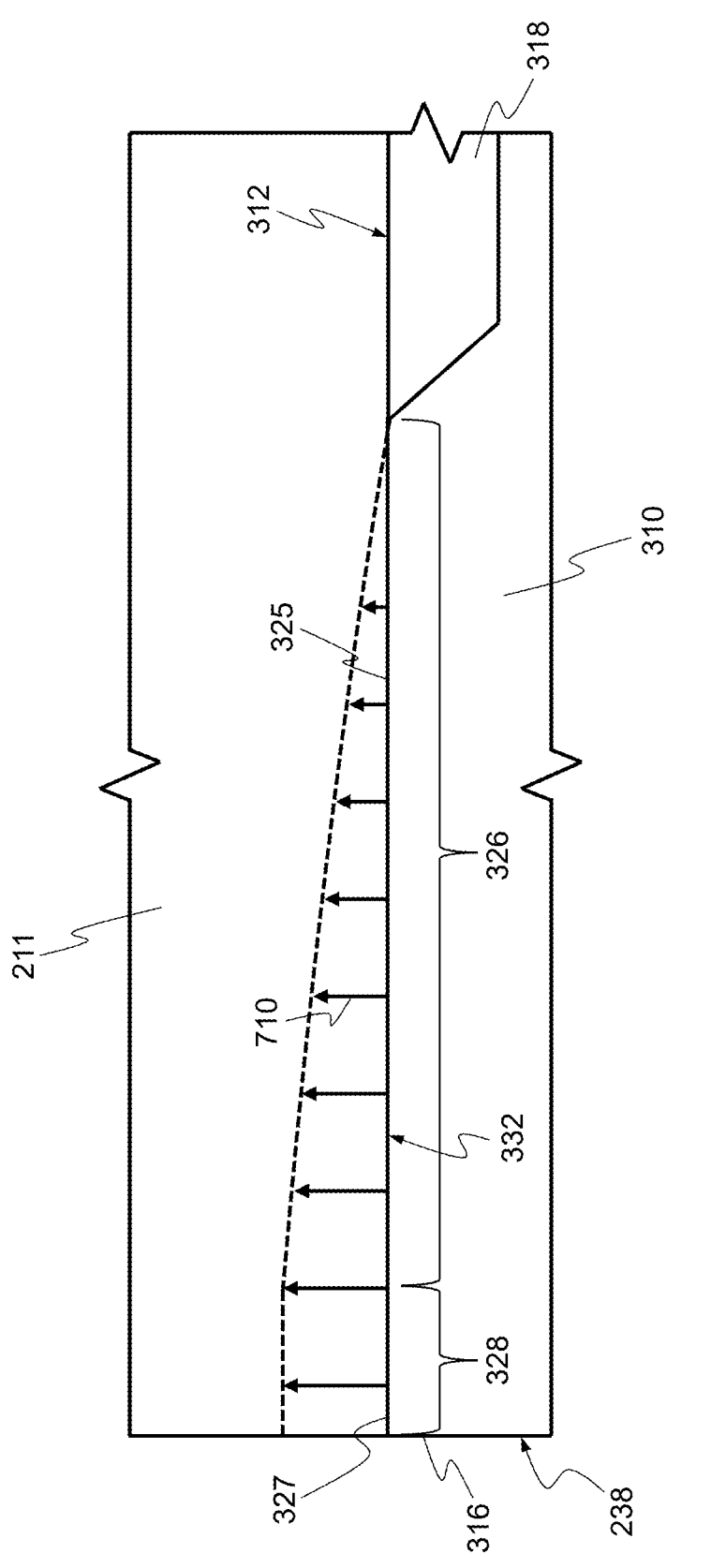
FIG. 8 is an enlarged cross-sectional view illustrating an interface between the nut face of FIGS. 3-7 and a contact surface in accordance with an embodiment.

FIG. 8 represents an enlarged, cross-sectional view illustrating an interface between the nut face 312 and the contact surface 332 when the nut 238 is fully coupled to the tie-shaft 230 to apply the predetermined axial load on the rotating component group 210. In this example, an entirety of the nut face 312 is in contact with the contact surface 332. A distribution of axial forces 710 is schematically represented along the contact surface 332. Notably, the axial forces 710 are concentrated radially outward, in this example, to a maximum axial force that is applied along the planar surface 327 of the radially outer portion 328, and are progressively less along the contoured surface 325 of the radially inner portion 326 toward the bore 322. The intensity of the forces is indicated by arrow length wherein larger forces are represented with longer arrows and vice versa. The intensity of the axial forces 710 along the contoured surface 325 may be dependent on the radius of curvature of the contoured surface 325 and/or the recessed dimension 329. By providing the contoured surface 325, the loading applied to the tie-shaft thread 330, or at least to a first of the tie-shaft ridges may be modified.

The systems disclosed herein, including the gas turbine engine 100 of the aircraft 101, provide for methods of securing rotating components in position on a shaft. For example, FIG. 9 is a flowchart illustrating an exemplary method 800. The method 800 may start at 810.

At 812, the method 800 may include supplying a threaded nut (e.g., the nut 238) including a body having a bore extending therethrough defined by inner surfaces thereof, a nut helical thread protruding from the inner surfaces, and a nut face on an end of the body.

At 814, the method 800 may include mounting the threaded nut on a shaft (e.g., the tic-shaft 230) supporting a rotating component such that the nut helical thread of the threaded nut is releasably coupled with a corresponding shaft helical thread protruding radially from the shaft.

At 816, the method 800 may include threading the threaded nut on the shaft such that the nut face contacts a contact surface of the rotating component or another component in contact with the rotating component and applies a predetermined axial load against the contact surface that is sufficient to maintain the rotating component in a fixed axial position on the shaft during rotation of the rotating component (e.g., during operation of a gas turbine engine).

At 818, the method 800 may include biasing the predetermined axial load toward a radially outer portion of the nut face in a manner that reduces a concentration of a load applied on a portion (e.g., a first ridge) of the shaft helical thread of the shaft that is axially closest to the contact surface and thereby promotes even distribution of the loading along the shaft helical thread. In some examples, biasing the predetermined axial load includes providing a contoured surface on a radially inner portion of the nut face that decreases in axial dimension from the radially outer portion to the bore.

The method 800 may end at 820.

The systems and methods disclosed herein provide various benefits over certain existing systems and methods. For example, providing the contoured surface 325 on the radially inner portion 326 of the nut face 312 biases compressive forces toward the radially outer portion 328 of the nut face 312 when in contact with the contact surface 332. This arrangement may reduce the concentration of a load applied on a first ridge of the tie-shaft thread 330 that is axially closest to the contact surface 332. In some examples, the arrangement may promote uniform loading along the tie-shaft thread 330 or otherwise more evenly distribute the load along the tie-shaft thread 330 of the tic-shaft 230. This in turn may promote an improved fatigue life of the tie-shaft 230, particularly for very high clamp loads used in next generation gas turbine engines.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A gas turbine engine, comprising:

a tie-shaft extending axially within the gas turbine engine and including a threaded portion having a shaft helical thread protruding radially therefrom;

a rotating component secured on the tie-shaft; and a threaded nut having a body with a bore extending therethrough defined by inner surfaces thereof, a nut helical thread protruding from the inner surfaces that is mated with the shaft helical thread of the tie-shaft, and a nut face on an end of the body, wherein the nut face has a minimum axial dimension at a radially inner portion thereof and a maximum axial dimension at a radially outer portion thereof as measured from a plane that is perpendicular to a central, longitudinal axis of the bore, wherein the nut face includes a curved, contoured surface that slopes from the radially outer portion toward the bore with a decreasing axial dimension, the contoured surface configured such that the radially outer portion undergoes greater axial compression than the radially inner portion when compressed against a contact surface of the rotating component or of another component in contact with the rotating component, thereby biasing the axial load toward the radially outer portion and limiting a concentration of loading on a first portion of the shaft helical thread that is closest to the contact surface, wherein the threaded nut is threaded onto the threaded portion of the tie-shaft to apply an axial load on the rotating component and thereby secure the rotating component on the tie-shaft, wherein the axial load is sufficient to compress the nut face such that a majority of the nut face directly contacts the contact surface.

2. The gas turbine engine of claim 1, wherein the radially outer portion of the nut face includes a planar surface that is perpendicular to a central, longitudinal axis of the bore.

3. The gas turbine engine of claim 1, wherein the contoured surface has a uniform radius of curvature from the radially outer portion to the bore.

4. The gas turbine engine of claim 1, wherein the axial load compresses the nut face such that an entirety of the nut face directly contacts the contact surface.

5. A method, comprising:

supplying a threaded nut including a body having a bore extending therethrough defined by inner surfaces thereof, a nut helical thread protruding from the inner surfaces, and a nut face on an end of the body, wherein the nut face has a minimum axial dimension at a radially inner portion thereof and a maximum axial dimension at a radially outer portion thereof as measured from a plane that is perpendicular to a central, longitudinal axis of the bore, wherein the nut face includes a curved, contoured surface that slopes from the radially outer portion toward the bore with a decreasing axial dimension;

mounting the threaded nut on a threaded shaft supporting a rotating component such that the nut helical thread of the threaded nut is releasably coupled with a corresponding shaft helical thread protruding radially from the threaded shaft;

threading the threaded nut on the threaded shaft such that the nut face contacts a contact surface of the rotating component or another component in contact with the rotating component and provides a predetermined axial load thereagainst and thereby secures the rotating component on the threaded shaft, wherein the predetermined axial load compresses the nut face against the contact surface, wherein the radially outer portion of the contoured surface undergoes greater axial compression than the radially inner portion when compressed thereby biasing the predetermined axial load toward the radially outer portion and limiting a concentration of loading on a first portion of the shaft helical thread that is closest to the contact surface.

6. The method of claim 5, wherein the radially outer portion of the nut face includes a planar surface that is perpendicular to a central, longitudinal axis of the bore.

7. The method of claim 5, wherein the contoured surface has a uniform radius of curvature from the radially outer portion to the bore.

8. The method of claim 5, wherein threading the threaded nut on the threaded shaft is performed such that a majority of the nut face directly contacts the contact surface.

9. The method of claim 5, wherein threading the threaded nut on the threaded shaft is performed such that an entirety of the nut face directly contacts the contact surface.

10. The method of claim 5, wherein the threaded shaft is a tie-shaft of a gas turbine engine, and the predetermined axial load maintains a fixed axial position of the rotating component on the tie-shaft during operation of the gas turbine engine.

* * * * *